(12) United States Patent
Li et al.

(10) Patent No.: US 11,249,458 B2
(45) Date of Patent: Feb. 15, 2022

(54) CONTROLLER AND CONTROL SYSTEM (71) Applicant: Fanuc Corporation, Yamanashi (JP)

(72) Inventors: Dapeng Li, Yamanashi (JP); Toshinori Matsukawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 100 days.

(21) Appl. No.: 16/382,882

(22) Filed: Apr. 12, 2019

(65) Prior Publication Data

US 2019/0317475 A1 Oct. 17, 2019

(30) Foreign Application Priority Data

Apr. 16, 2018 (JP) .............................. JP2018-078242

(51) Int. Cl.
*G05B 19/00* (2006.01)
*G05B 19/4099* (2006.01)
*G06T 7/00* (2017.01)

(52) U.S. Cl.
CPC ........ *G05B 19/4099* (2013.01); *G06T 7/0008* (2013.01); *G05B 2219/35134* (2013.01); *G05B 2219/37558* (2013.01); *G06T 2207/10004* (2013.01); *G06T 2207/30164* (2013.01)

(58) Field of Classification Search
None
See application file for complete search history.

(56) References Cited

U.S. PATENT DOCUMENTS

2004/0249495 A1 12/2004 Orozco et al.
2009/0152245 A1* 6/2009 Wang ..................... B23K 31/12
219/117.1
2009/0204249 A1 8/2009 Koch et al.
2010/0063615 A1 3/2010 Mori et al.
2010/0292822 A1* 11/2010 Hahn ................ G05B 19/40937
700/98
2013/0276280 A1 10/2013 Wielens et al.
(Continued)

FOREIGN PATENT DOCUMENTS

JP 06277981 A 10/1994
JP 7302108 A 11/1995
(Continued)

OTHER PUBLICATIONS

Notice of Reasons for Refusal for Japanese Application No. 2018-078242, dated May 19, 2020, with translation, 8 pages.
(Continued)

*Primary Examiner* — Paul B Yanchus, III (74) *Attorney, Agent, or Firm* — RatnerPrestia (57) ABSTRACT

A control system includes a controller that controls machining of a workpiece, and a photographing device that photographs an image of the workpiece under machining operation. The controller generates a three-dimensional model of the workpiece under machining operation based on the acquired image, compares the generated three-dimensional model and a three-dimensional model generated by a machining simulation with each other, and determines a presence or absence of a machining defect based on a result of the comparison. When the machining defect is present and re-machining is possible, a setting is modified depending on a cause of the machining defect and additional machining is executed based on the modified setting.

4 Claims, 11 Drawing Sheets

(56) References Cited

U.S. PATENT DOCUMENTS

| | | | |
|---|---|---|---|
| 2014/0088746 A1* | 3/2014 | Maloney | G05B 19/4099 |
| | | | 700/97 |
| 2016/0377424 A1 | 12/2016 | Clark | |
| 2018/0147645 A1* | 5/2018 | Boccadoro | B23H 1/02 |
| 2019/0253695 A1* | 8/2019 | Festa | H04N 13/243 |

FOREIGN PATENT DOCUMENTS

| | | |
|---|---|---|
| JP | 11296218 A | 10/1999 |
| JP | 2007526125 A | 9/2007 |
| JP | 2008-542888 A | 11/2008 |
| JP | 2010061661 A | 3/2010 |
| JP | 2017054486 A | 3/2017 |

OTHER PUBLICATIONS

Japanese Decision to Grant a Patent for Japanese Application No. 2018-078242, dated Jan. 26, 2021, with translation, 5 pages.

\* cited by examiner

CONTROLLER AND CONTROL SYSTEM

RELATED APPLICATIONS

The present application claims priority to Japanese Patent Application Number 2018-078242 filed Apr. 16, 2018, the disclosure of which is hereby incorporated by reference herein in its entirety.

BACKGROUND OF THE INVENTION

1. Field of the Invention

The present invention relates to a controller and a control system, and more particularly, to a controller and a control system capable of monitoring a machining state and performing an automatic correction.

2. Description of the Related Art

Figure 1:
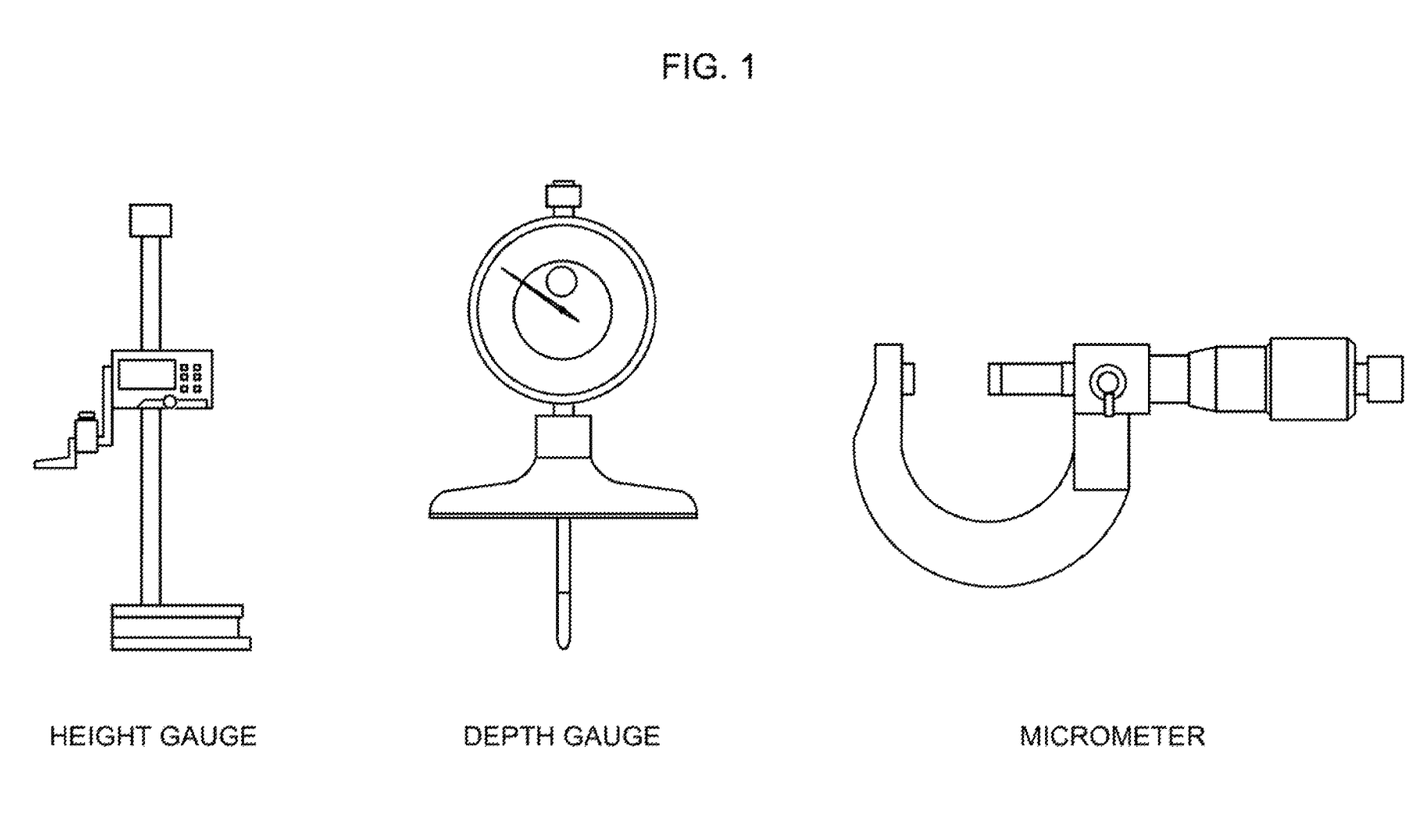
FIG. 1 is a diagram showing examples of a conventional dimension measuring instrument.

In general, an operation of machining a part used for a machine tool, a robot (hereinafter, simply referred to as a machine) includes a process of measuring dimensions of a workpiece under machining operation. Conventionally, a dimension measuring instrument such as a height gauge, a depth gauge, or a micrometer shown in FIG. 1 has been used in the measuring process.

When a measurement value obtained in the measuring process deviates from a tolerance, that is, when the measurement value exceeds a maximum value or is smaller than a minimum value, the maximum value and the minimum value being determined based on reference dimensions, the workpiece is mended (additionally machined by modifying an offset value or the like) or is remade (the workpiece under machining operation is discarded as a defective product).

In the conventional measuring process, the workpiece has been required to be unloaded from the machine once, which adversely affects a capacity ratio. Japanese Patent Application Laid-Open No. 2008-542888 discloses a technology which enables a measuring process to be performed for a workpiece within a machine without unloading the workpiece from the machine. In this technology, when a machining quantity (geometric shape) measured during machining is compared with a machining quantity calculated from a simulation model, and the machining quantities do not coincide with each other as a result of the comparison, determination of whether or not the workpiece can be used by being additionally machined, or whether or not the machining should be stopped is automatically performed.

Japanese Patent Application Laid-Open No. 2008-542888 does not disclose a detailed method for performing a measuring process in a machine. Therefore, a time required for the measuring process is unknown, and an effect of improving a capacity ratio of this technology in comparison to the conventional method is unknown. In addition, only whether a machining result is good or poor is determined and identification of a cause of a machining defect cannot yet be performed in this technology. Therefore, automatic mending is not performed even when additional machining is required, which results in a limited effect of improving a capacity ratio.

SUMMARY OF THE INVENTION

An object of the present invention is to provide a controller and a control system capable of monitoring a machining state and performing an automatic correction.

A control system according to an embodiment of the present invention includes: a controller that controls machining of a workpiece; and a photographing device that photographs an image of the workpiece under machining operation. The controller includes an image acquisition unit that acquires the image, a three-dimensional model generation unit that generates a three-dimensional model of the workpiece under machining operation based on the image, a checking unit that compares the three-dimensional model of the workpiece under machining operation and a three-dimensional model generated by a machining simulation with each other, a calculation unit that determines a presence or absence of a machining defect based on a result of the comparison and modifies a setting depending on a cause of the machining defect when it is determined that the machining defect is present and re-machining is possible, and an instruction distribution processing unit that executes additional machining based on the modified setting.

When it is determined that the machining defect is present and the re-machining is not possible, the calculation unit may present the cause of the machining defect or a countermeasure for the machining defect.

A control system according to another embodiment of the present invention includes: a controller that controls machining of a workpiece; and a photographing device that photographs the workpiece under machining operation and outputs a three-dimensional model of the workpiece under machining operation. The controller includes an image acquisition unit that acquires the three-dimensional model of the workpiece under machining operation, a checking unit that compares the three-dimensional model of the workpiece under machining operation and a three-dimensional model generated by a machining simulation with each other, a calculation unit that determines a presence or absence of a machining defect based on a result of the comparison and modifies a setting depending on a cause of the machining defect when it is determined that the machining defect is present and re-machining is possible, and an instruction distribution processing unit that executes additional machining based on the modified setting.

A controller according to still another embodiment of the present invention includes a checking unit that acquires a three-dimensional model of a workpiece under machining operation and compares the three-dimensional model of the workpiece under machining operation and a three-dimensional model generated by a machining simulation with each other, a calculation unit that determines a presence or absence of a machining defect based on a result of the comparison and modifies a setting depending on a cause of the machining defect when it is determined that the machining defect is present and re-machining is possible, and an instruction distribution processing unit that executes additional machining based on the modified setting.

According to the present invention, it is possible to provide a controller and a control system capable of monitoring a machining state and performing an automatic correction.

DETAILED DESCRIPTION OF THE PREFERRED EMBODIMENTS

First Embodiment

Figure 13:
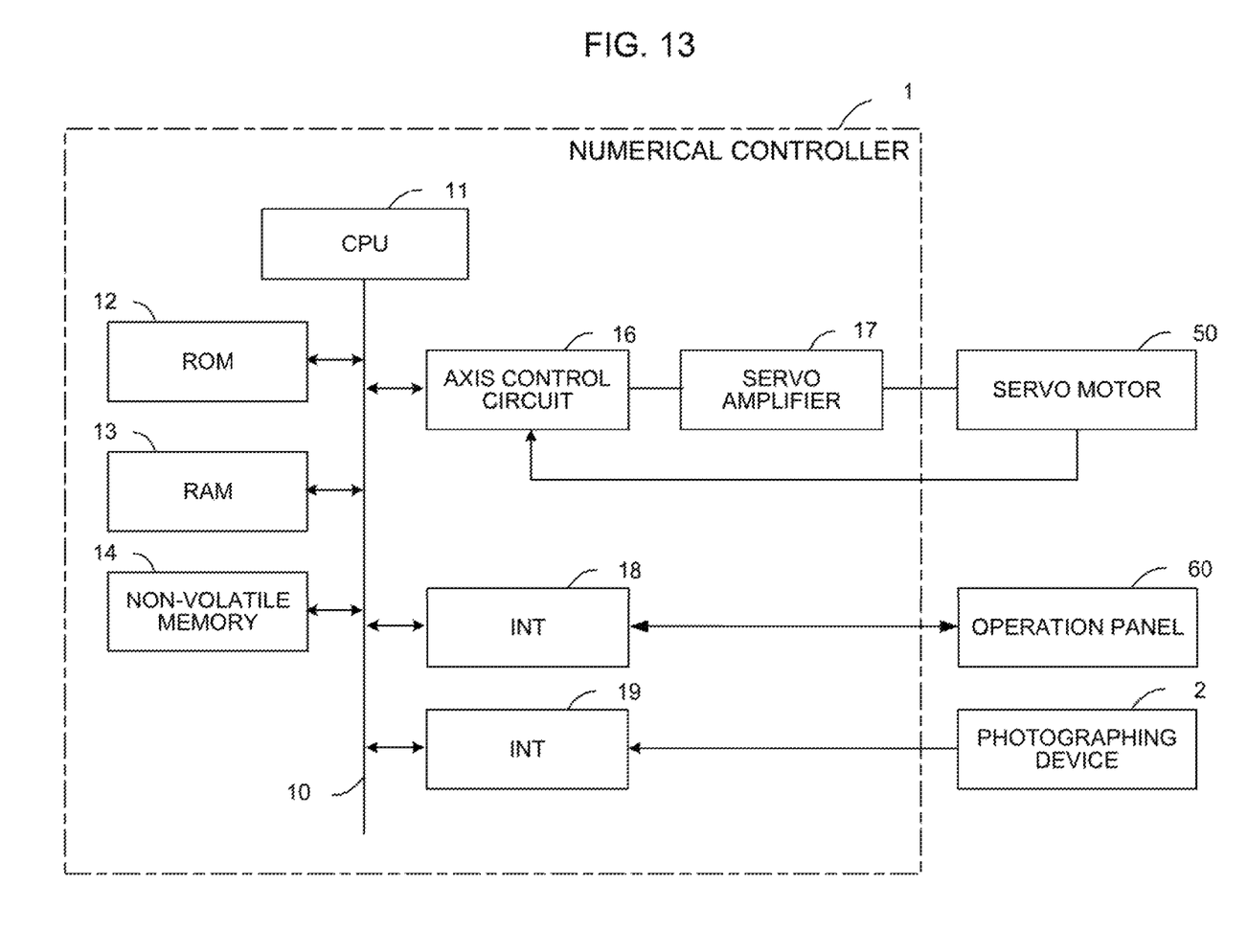
FIG. 13 is a schematic hardware configuration diagram showing main parts of a controller.

FIG. 13 is a schematic hardware configuration diagram showing main parts of a controller 1 according to a first embodiment of the present invention.

A controller 1, which controls a machine, is a numerical controller of a machine tool, or a controller of a robot. The controller 1 includes a central processing unit (CPU) 11, a read-only memory (ROM) 12, a random access memory (RAM) 13, a non-volatile memory 14, an interface 18, an interface 19, a bus 10, an axis control circuit 16, and a servo amplifier 17. A servo motor 50, an operation panel 60, and a photographing device 2 are connected to the controller 1.

The CPU 11 is a processor which controls the controller 1 overall. The CPU 11 reads a system program stored in the ROM 12 through the bus 10 and controls the controller 1 according to the system program overall.

The ROM 12 stores a system program for executing various controls of the machine or the like in advance.

The RAM 13 temporarily stores temporary calculation data or display data, data input by an operator through the operation panel 60 to be described later, an image photographed by the photographing device 2, or the like.

The non-volatile memory 14 is backed up by, for example, a battery (not shown) and maintains a storage state even when a power supply of the controller 1 is shutoff. The non-volatile memory 14 stores data input through the operation panel 60, an image input from the photographing device 2 through the interface 19, or the like. A program or data stored in the non-volatile memory 14 may be developed in the RAM 13 at the time of execution and use thereof.

The axis control circuit 16 controls motion axes of the machine. The axis control circuit 16 receives an axis movement command output from the CPU 11 and outputs the axis movement command to the servo amplifier 17.

The servo amplifier 17 receives an axis movement command output from the axis control circuit 16 and drives the servo motor 50.

The servo motor 50 is driven by the servo amplifier 17 to make the motion axes of the machine move. Typically, a position/speed detector is embedded in the servomotor 50. The position/speed detector outputs a position/speed feedback signal and the signal is fed back to the axis control circuit 16, thereby performing a position/speed feedback control.

Although only one axis control circuit 16, servo amplifier 17, and servomotor 50 are shown in FIG. 13, in practice, the axis control circuit 16, the servo amplifier 17, and the servo motor 50 are provided in accordance with the number of axes included in the machine which are control targets. For example, when a robot including six axes is controlled, six sets of the axis control circuit 16, the servo amplifier 17, and the servo motor 50, which correspond to the respective axes, are provided.

The operation panel 60 is a data input and output device including a display, a hardware key, or the like. The operation panel 60 causes the display to display information received from the CPU 11 through the interface 18. The operation panel 60 transfers, to the CPU 11 through the interface 18, an instruction, data, or the like input through the hardware key or the like.

The interface 19 is a communication interface for connecting the controller 1 and the photographing device 2 to each other.

The photographing device 2 outputs an image generated by photographing a workpiece under machining operation. It is preferable that the photographing device 2 is installed in the machine. Typically, the photographing device 2 includes a projector projecting multi-pattern light to a workpiece and a camera generating image data by photographing the workpiece to which the multi-pattern light is projected. The photographing device 2 transfers the image data to the CPU 11 through the interface 19.

Figure 12:
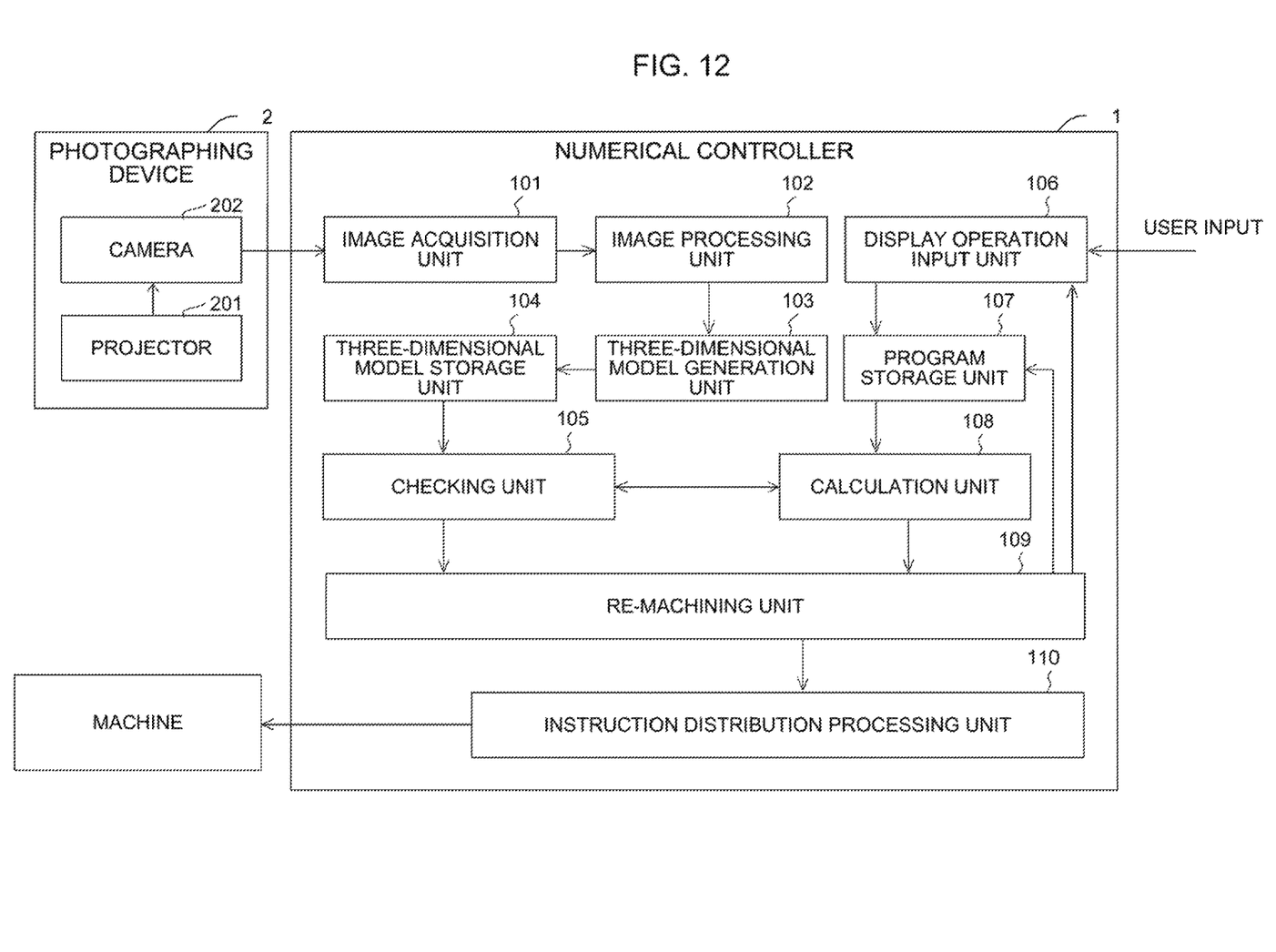
FIG. 12 is a schematic functional block diagram of a control system according to a first embodiment.

FIG. 12 is a schematic functional block diagram of a control system 100 including the controller 1 and the photographing device 2.

The controller 1 includes an image acquisition unit 101, an image processing unit 102, a three-dimensional model generation unit 103, a three-dimensional model storage unit 104, a checking unit 105, a display operation input unit 106, a program storage unit 107, a calculation unit 108, a re-machining unit 109, and an instruction distribution processing unit 110. These units may be implemented as functions of the CPU 11, or may be implemented by the CPU 11 which executes a program stored in the ROM 12, the RAM 13, and the non-volatile memory 14. The photographing device 2 includes a projector 201 and a camera 202.

Hereinafter, functions of respective processing units will be described according to a processing progression order.

Photographing of Workpiece Under Machining Operation

The projector 201 projects multi-pattern light to a workpiece under machining operation in a machine according to, for example, an instruction from the CPU 11. As the multi-pattern light is projected, various light patterns are formed on a surface of the workpiece.

The camera 202 photographs the workpiece to which the multi-pattern light is projected and generates image data. The camera 202 outputs the generated image data to the image acquisition unit 101. The camera 202 can generate a plurality of image data by photographing the workpiece plural times while changing a relative position between the camera 202 and the workpiece. For example, a holder of a jig of the workpiece is rotated by a predetermined angle according to an instruction from the CPU 11, and the camera 202 with a fixed position or a fixed angle photographs an image of the workpiece each time the holder is rotated. Alternatively, the camera 202 held by an arm of a robot (not shown) may be rotated around the workpiece which stands still by a predetermined angle, and the camera 202 may photograph the image of the workpiece each time the camera 202 is rotated.

An example of a process of photographing the workpiece under machining operation by the projector 201 and the camera 202 will be described with reference to FIGS. 2A to 3.

Figure 2A:
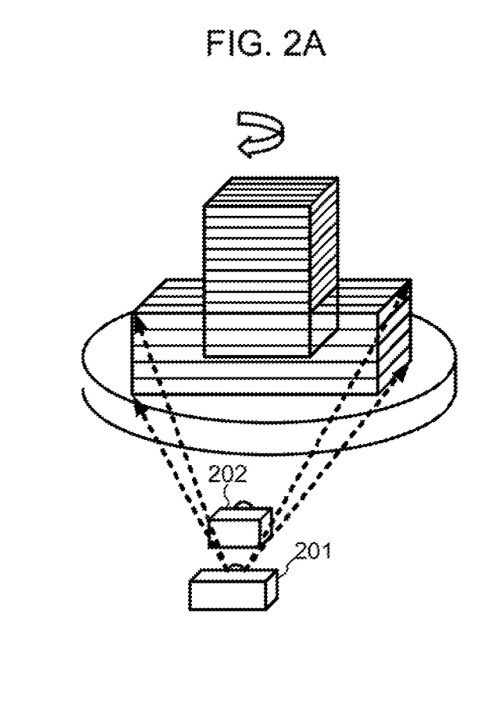
FIGS. 2A to 2C are diagrams showing a process of photographing a workpiece under machining operation.
Figure 2B:
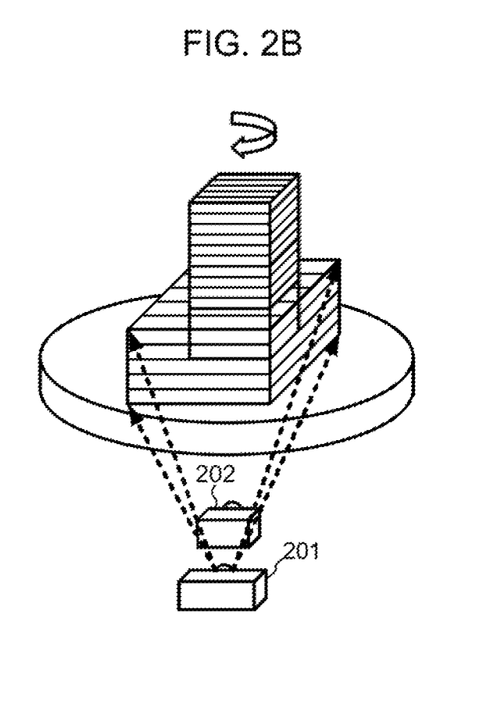
Figure 2C:
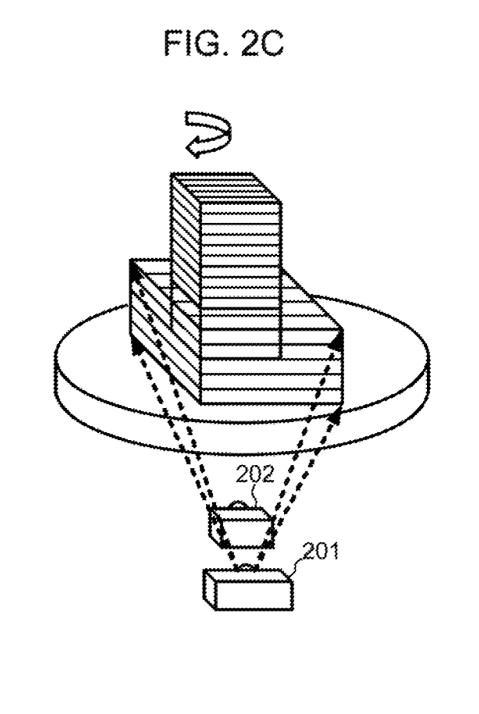
Figure 3:
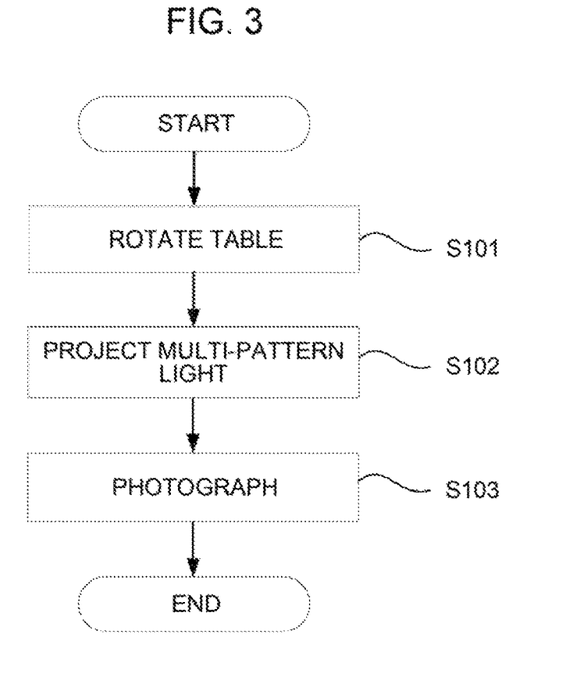
FIG. 3 is a flowchart showing the process of photographing a workpiece under machining operation.

In FIG. 2A, a loading table of the workpiece is rotated in a horizontal direction by 120 degrees according to an instruction from the CPU 11 (step S101 in a flowchart of FIG. 3). The projector 201 projects multi-pattern light to the workpiece according to an instruction from the CPU 11 (step S102). The camera 202 photographs the workpiece according to an instruction from the CPU 11 (step S103). Then, the workpiece is photographed while being rotated by 120 degrees as shown in FIG. 2B and FIG. 2C (steps S101 and S103 are repeated a total of three times). The camera 202 outputs three image data generated by the photographing to the image acquisition unit 101.

Generation of Three-Dimensional Model of Workpiece Under Machining Operation The image acquisition unit 101 acquires one or more image data generated through photographing by the camera 202. The image data are generated through photographing of the workpiece under machining operation, the workpiece having a surface to which the multi-pattern light is projected. The image acquisition unit 101 may acquire a plurality of image data generated through photographing of the workpiece which is performed while changing the position of the camera 202 relative to the workpiece.

The image processing unit 102 extracts feature points from one or more image data acquired by the image acquisition unit 101. Typically, the image processing unit 102 extracts points constituting an edge or a surface of the workpiece as feature points, based on a change in a pattern of projected light. A process of extracting feature points is known in the art, and a detailed description thereof will thus be omitted here.

The three-dimensional model generation unit 103 generates a three-dimensional model based on the feature points extracted by the image processing unit 102 from one or more image data. A process of generating a three-dimensional model by using feature points is known in the art, and a detailed description thereof will thus be omitted here.

The three-dimensional model storage unit 104 is a storage region in which the three-dimensional model generated by the three-dimensional model generation unit 103 is stored.

A process of generating a three-dimensional model will be described with reference to FIG. 4 and FIG. 5.

Figure 4:
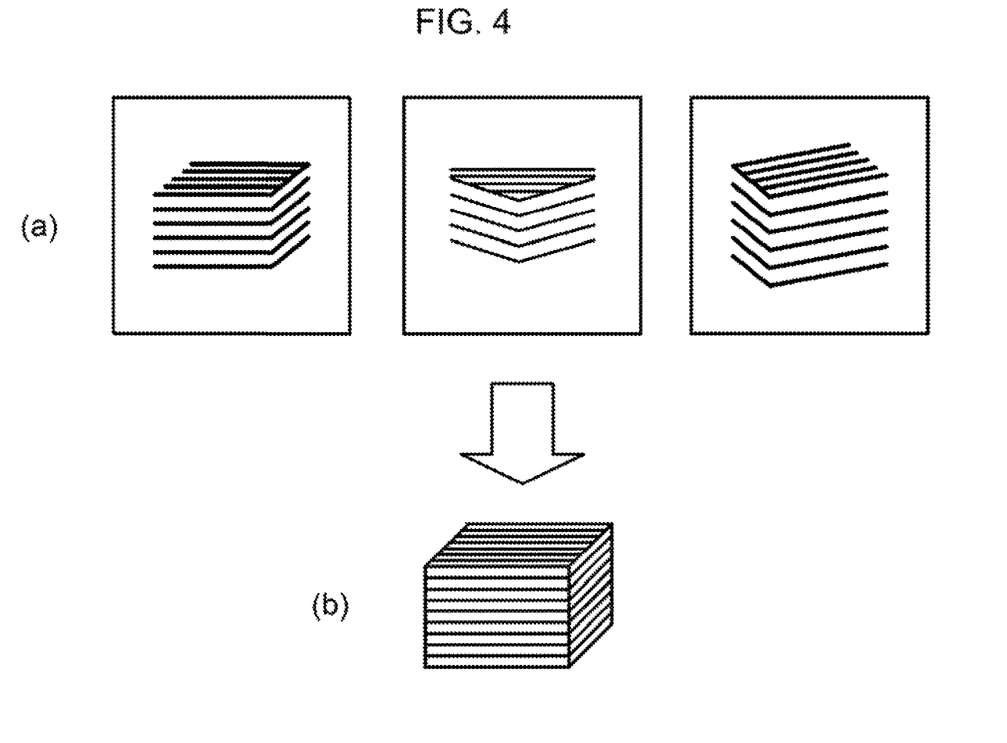
FIG. 4 is a diagram showing a process of generating a three-dimensional model.
Figure 5:
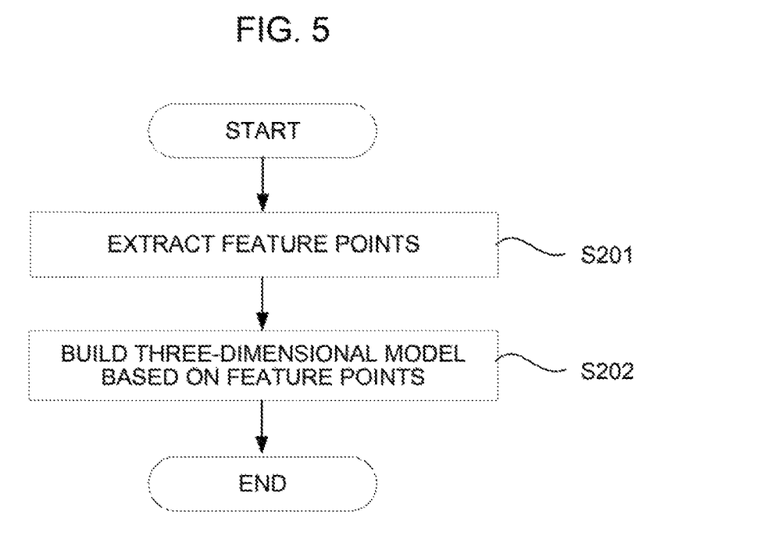
FIG. 5 is a flowchart showing the process of generating a three-dimensional model.

The image processing unit 102 extracts feature points from one or more image data as shown in (a) in FIG. 4 (step S201 in a flowchart of FIG. 5). The three-dimensional model generation unit 103 builds a three-dimensional model as shown in (b) in FIG. 4 based on the extracted feature points (step S202). The built three-dimensional model is stored in the three-dimensional model storage unit 104.

Generation of Three-Dimensional Model of Workpiece Based on Machining Program The display operation input unit 106 receives an input of a machining program (hereinafter, simply referred to as a program) through the operation panel 60, an input interface (not shown), or the like. In addition, the input machining program, various processing results, and the like are displayed on the display of the operation panel 60.

The program storage unit 107 is a storage region in which the program acquired by the display operation input unit 106 is stored.

The calculation unit 108 performs a machining simulation based on the program stored in the program storage unit 107 and generates a three-dimensional model of a machined workpiece. The generated three-dimensional model shows an ideal shape of the workpiece and is used for determination of a presence or absence of a machining defect, which is performed by the checking unit 105. A process of generating a three-dimensional model by using a machining simulation is known in the art, and a detailed description thereof will thus be omitted here.

Determination of Machining Defect

The checking unit 105 compares the three-dimensional model which shows a shape of the workpiece under machining operation and is stored in the three-dimensional model storage unit 104 with the three-dimensional model which shows an ideal shape of the workpiece based on the machining program and is calculated by the calculation unit 108 to be described later. The checking unit 105 performs a comparison between the three-dimensional models with respect to one or more predetermined surfaces or edges of the three-dimensional model, respectively. In the comparison between the three-dimensional models, when a position of a surface or an edge of the three-dimensional model stored in the three-dimensional model storage unit 104 deviates from a tolerance based on the three-dimensional model calculated by the calculation unit 108, the checking unit 105 determines that the workpiece under machining operation is defective, and when the position of the surface or the edge of the three-dimensional model stored in the three-dimensional model storage unit 104 does not deviate from the tolerance, the checking unit 105 determines that the workpiece under machining operation is normal.

A process of determining a machining defect will be described with reference to FIG. 6 and FIG. 7.

Figure 6:
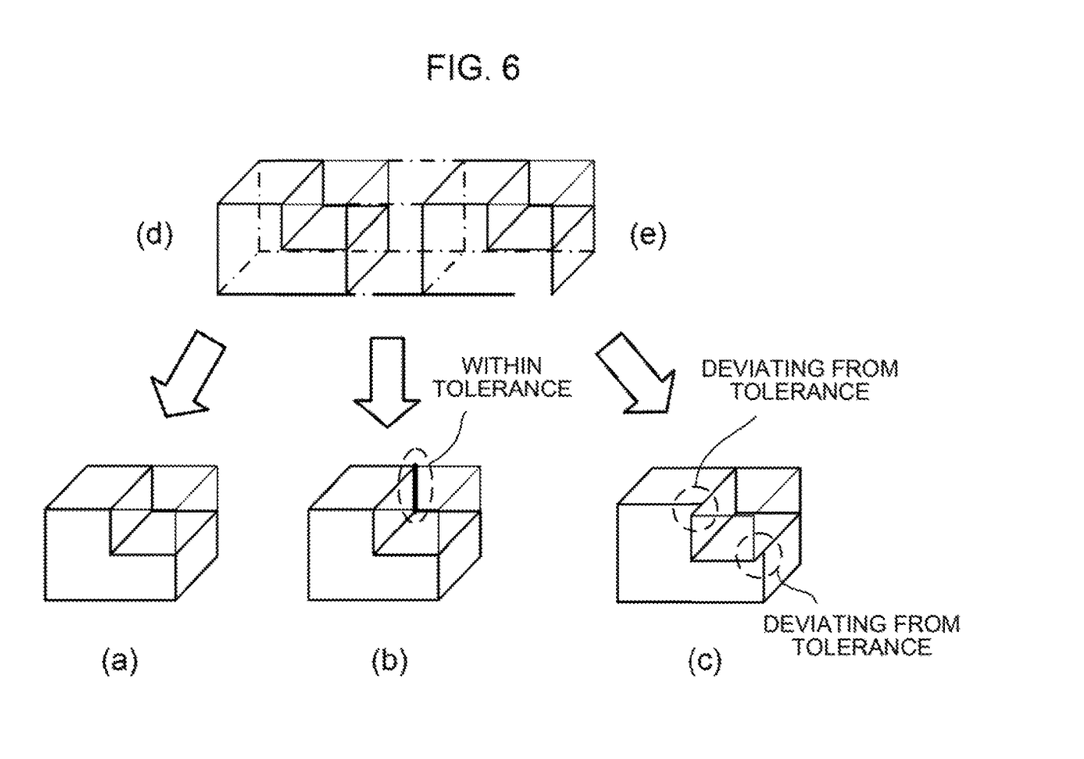
FIG. 6 is a diagram showing a process of determining a presence or absence of a machining defect.
Figure 7:
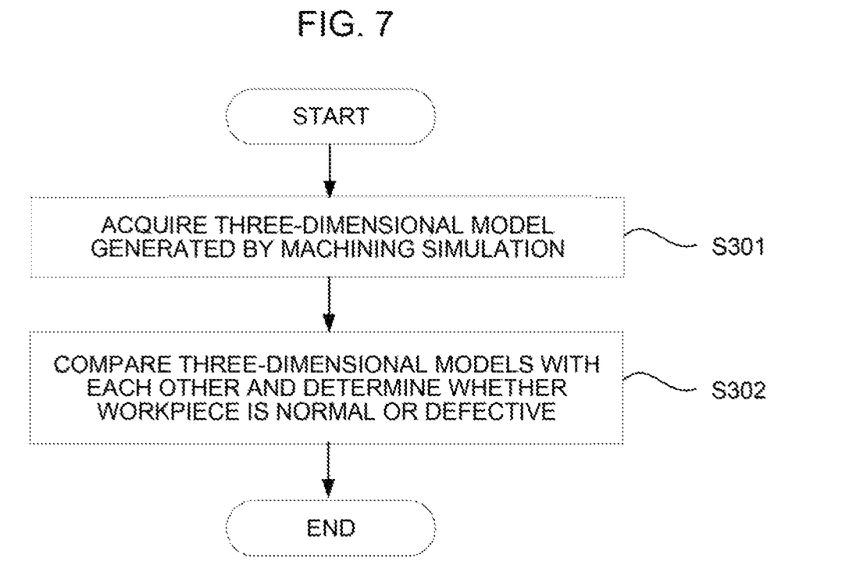
FIG. 7 is a flowchart showing the process of determining a presence or absence of a machining defect.

The checking unit 105 acquires the ideal three-dimensional model based on the machining program (step S301 in a flowchart of FIG. 7) and compares the three-dimensional model of the workpiece under machining operation with the ideal three-dimensional model based on the machining program as shown in (d) and (e) in FIG. 6. As a result of the comparison, when the three-dimensional models coincide with each other as shown in (a) in FIG. 6, or when a difference between the three-dimensional models is within a tolerance as shown in (b) in FIG. 6, it is determined that the workpiece is normal. In this case, additional machining is not executed. When the difference between the three-dimensional models deviates from the tolerance as shown in (c) in FIG. 6, it is determined that the workpiece is defective. In this case, additional machining is considered (step S302).

Estimation of Cause of Machining Defect and Automatic Correction

When the checking unit 105 determines that the workpiece has a machining defect, the calculation unit 108 calculates a difference value between a position of a surface or an edge of the three-dimensional model stored in the three-dimensional model storage unit 104 and a position of a surface or an edge of the three-dimensional model calculated by the calculation unit 108. The calculation unit 108 outputs the calculated difference value to the re-machining unit 109.

The re-machining unit 109 estimates a cause of the machining defect based on the difference value acquired from the calculation unit 108. More specifically, the re-machining unit 109 classifies the workpiece having a machining defect as a workpiece which cannot be re-machined or a workpiece which can be re-machined based on the difference value. In a case where the re-machining of the workpiece is not possible, the re-machining unit 109 can cause the display operation input unit 106 to display a message including a suggestion for helping solve the cause of the defect. In a case where the re-machining of the workpiece is possible, the re-machining unit 109 automatically executes a countermeasure for resolving the defect and executes additional machining. By doing so, the defect is automatically resolved.

When the difference value output from the calculation unit 108 varies widely depending on comparing places (a plurality of surfaces or edges), the re-machining unit 109 determines that the re-machining of the workpiece is not possible. For example, a distribution of difference values obtained at a plurality of comparing places exceeds a predetermined threshold value, it is determined that the difference value varies widely. This is because there are various causes and it is thus likely that the defect cannot be resolved by mending the workpiece through re-machining.

In this case, the re-machining unit 109 causes the display of the display operation input unit 106 to display a message for prompting, for example, modification of an original point, modification of a setting of a program, modification of an initial setting, confirmation of deformation of the workpiece, or the like.

When dimensions of portions of the three-dimensional model stored in the three-dimensional model storage unit 104 are less than minimum permissible dimensions, respectively, in other words, when the dimensions of the portions of the three-dimensional model stored in the three-dimensional model storage unit 104 are smaller than those (reference dimensions) of the three-dimensional model calculated by the calculation unit 108 and a difference between the dimensions of the portions of the three-dimensional model stored in the three-dimensional model storage unit 104 and reference dimensions is equal to or more than a predetermined allowable error, the re-machining unit 109 determines that the re-machining of the workpiece is not possible. This is because the workpiece is excessively cut and it is thus not possible to mend the workpiece through re-machining.

In this case, the re-machining unit 109 causes the display of the display operation input unit 106 to display a message for prompting, for example, modification of an offset value, modification of dimensions of the workpiece, or the like.

When the dimensions of the three-dimensional model stored in the three-dimensional model storage unit 104 exceed maximum permissible dimensions, respectively, in other words, when the dimensions of the three-dimensional model stored in the three-dimensional model storage unit 104 are larger than those (reference dimensions) of the three-dimensional model calculated by the calculation unit 108 and a difference between the dimensions of the three-dimensional model stored in the three-dimensional model storage unit 104 and the reference dimensions is equal to or more than the predetermined allowable error, the re-machining unit 109 determines that the re-machining of the workpiece is possible. This is because the workpiece is insufficiently cut and it is thus possible to mend the workpiece through re-machining.

An optimum countermeasure varies depending on an aspect of the insufficient cutting of the workpiece. The re-machining unit 109 executes a countermeasure appropriate for resolving the machining defect.

An inappropriate set position of the workpiece (a case where a setting value and an actual position do not coincide with each other) can be considered as a cause of insufficient cutting of a side surface of the workpiece. This cause of the insufficient cutting can be solved by modifying a position of the workpiece or a setting value of a machining dimension in the program by an amount corresponding to the difference value. The re-machining unit 109 performs relevant modification of the program or the like. Then, the instruction distribution processing unit 110 executes additional machining. The insufficient cutting is resolved by the additional machining.

Inappropriate machining dimensions set in the program (small cutting amount), an inappropriate offset value of a tool (a case where a setting value and an actual length or diameter of the tool do not coincide with each other), and the like can be considered as a cause of insufficient cutting of only a portion (for example, a hole in a portion) of the workpiece. All the causes of the insufficient cutting can be solved by modifying a setting value of a machining dimension in the program or an offset value by an amount corresponding to the difference value. The re-machining unit 109 performs relevant modification of the program or an offset value. At this time, the instruction distribution processing unit 110 executes additional machining. The insufficient cutting is resolved by the additional machining.

An inappropriate offset value of a tool (a case where a setting value and an actual length or diameter of the tool do not coincide with each other), an inappropriate size of the workpiece (a case where a setting value and an actual size do not coincide with each other), and the like can be considered as a cause of insufficient cutting of the entire workpiece, that is, insufficient cutting of a plurality of surfaces. All the causes of the insufficient cutting can be solved by adding an amount corresponding to the difference value to a machining dimension in the program. The re-machining unit 109 performs relevant modification of the program or the like. Then, the instruction distribution processing unit 110 executes additional machining. The insufficient cutting is resolved by the additional machining.

A process of estimating a cause of a machining defect and performing an automatic correction will be described with reference to FIGS. 8 to 11.

Figure 8:
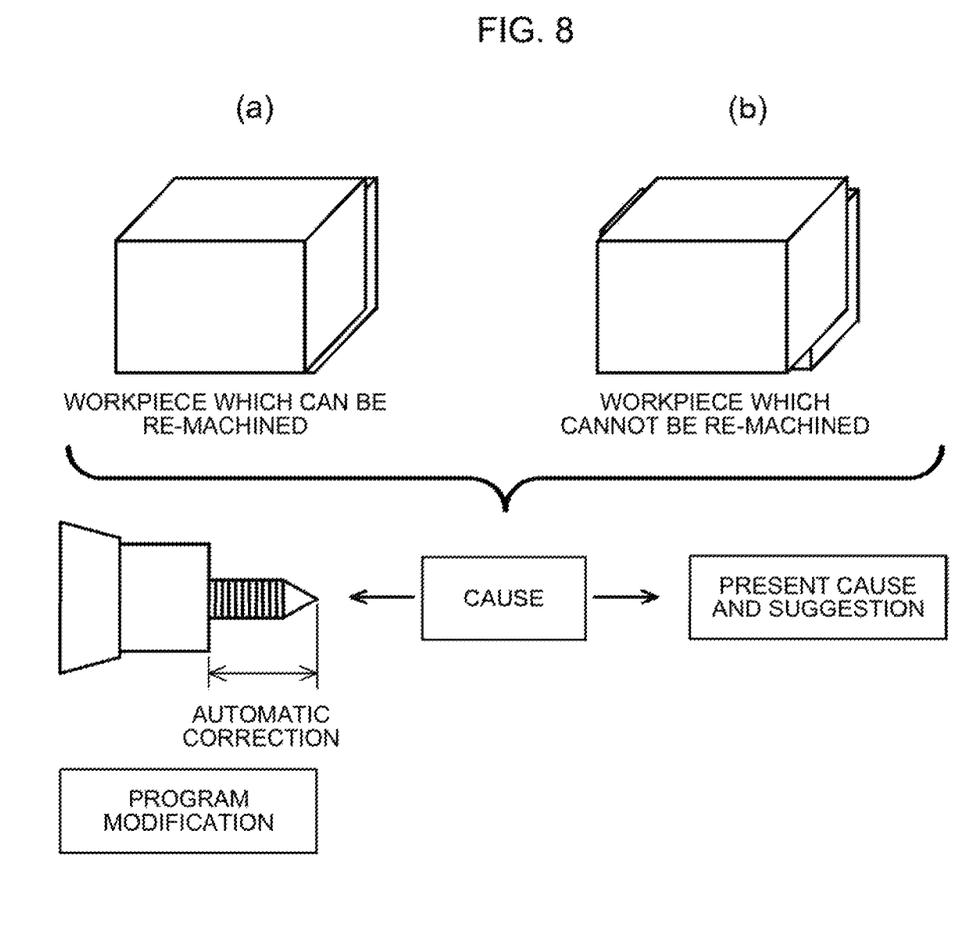
FIG. 8 is a diagram showing a process of estimating a cause of the machining defect and automatically correcting the machining defect.
Figure 9:
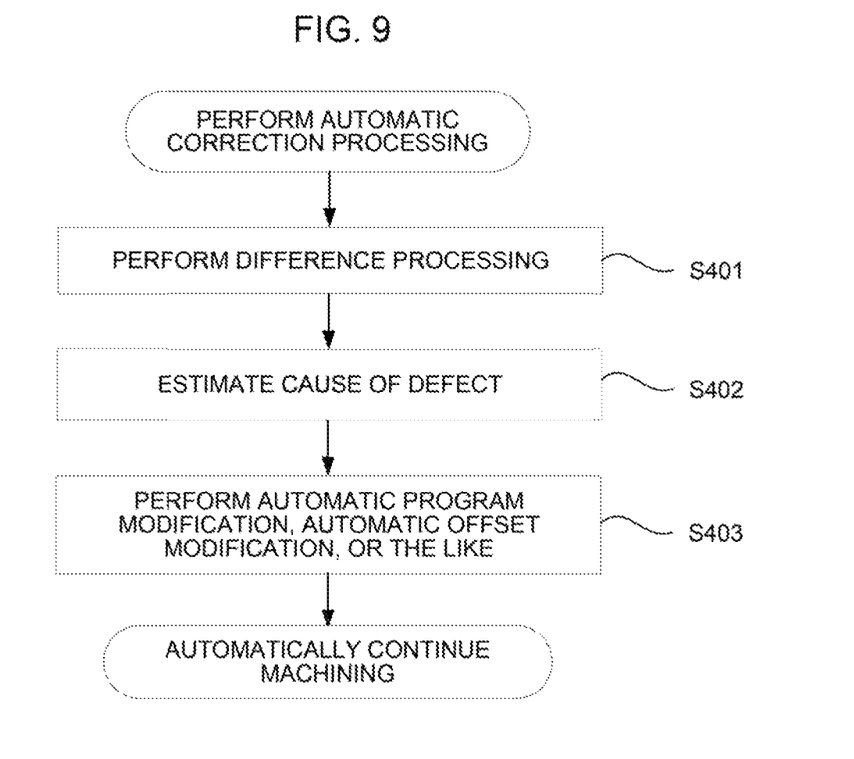
FIG. 9 is a flowchart showing the process of estimating a cause of the machining defect and automatically correcting the machining defect.
Figure 10:
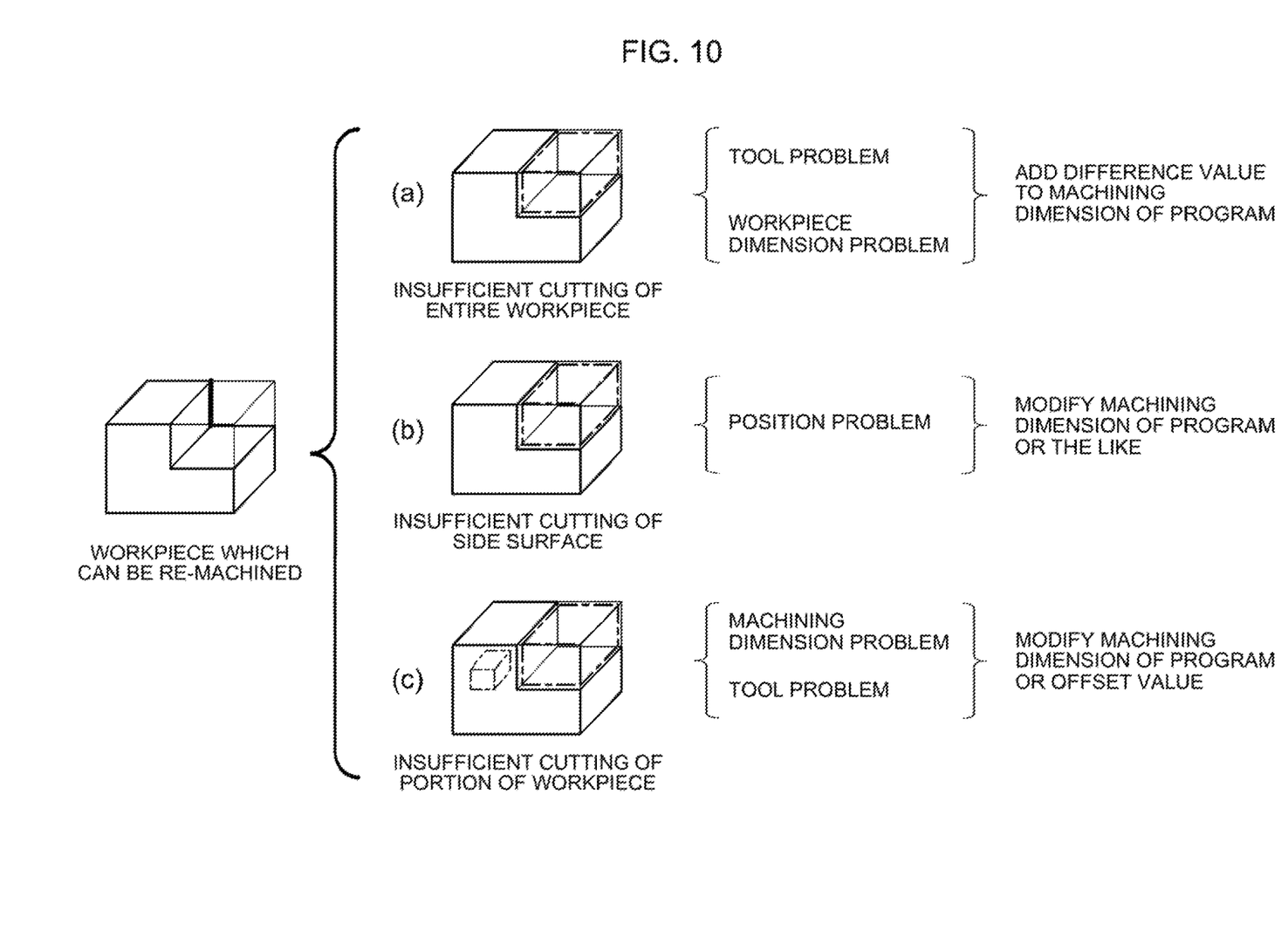
FIG. 10 is a diagram showing the process of estimating a cause of the machining defect and automatically correcting the machining defect.
Figure 11:
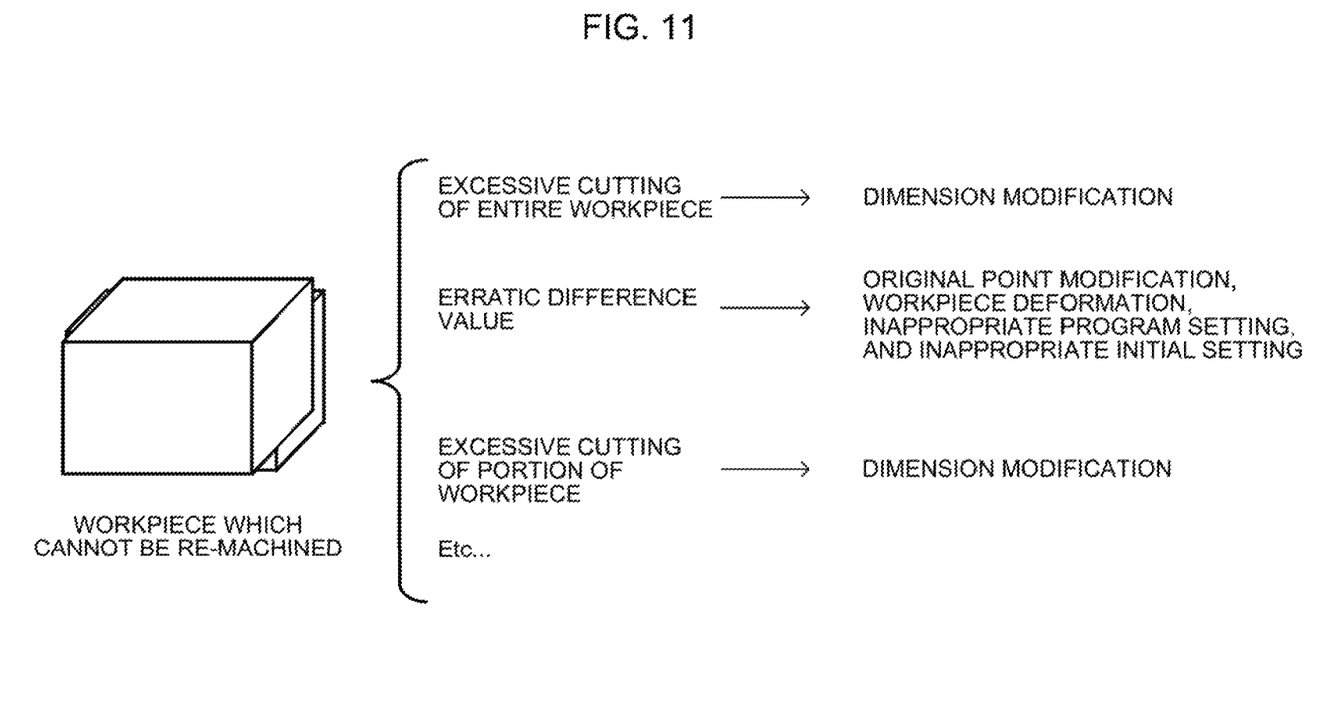
FIG. 11 is a diagram showing the process of estimating a cause of the machining defect and automatically correcting the machining defect.

The re-machining unit 109 distinguishes workpieces as a workpiece of which remachining is possible ((a) in FIG. 8) and a workpiece of which remachining is not possible ((b) in FIG. 8) based on the difference value between the dimensions of the three-dimensional model stored in the three-dimensional model storage unit 104 and the dimensions of the three-dimensional model calculated by the calculation unit 108 (step S401 in a flowchart of FIG. 9). When the re-machining of the workpiece is not possible ((b) in FIG. 8), an estimated cause, a countermeasure, and the like as shown in FIG. 11 are presented to the operator. When the re-machining of the workpiece is possible ((a) in FIG. 8), a countermeasure such as modification of the program and correction of an offset value is automatically executed, and additional machining is executed. That is, as shown in FIG. 10, a cause of a machining defect is estimated based on an aspect of the defect (step S402), a countermeasure such as modification of the program or the like, which corresponds to the cause, is executed (step S403), and additional machining is executed.

According to the present embodiment, as a machining defect can be checked within a machine, a workpiece need not be unloaded and it is thus possible to further improve a capacity ratio in comparison to the related art. For example, the image of the workpiece is photographed at a plurality of angles by rotating a table at the time of generation of a three-dimensional model, as a result, it is possible to check a machining defect within a short time while reducing costs for installation of a camera. In addition, a cause of the machining defect is estimated, and when automatic mending can be performed, appropriate additional machining is automatically executed. As a result, it is possible to further improve a capacity ratio without stopping the machining operation. When the automatic mending cannot be performed, a message for estimating and helping resolve the cause of the machining defect is output, therefore, it is possible to contribute to reduction of a defective product.

Second Embodiment

Figure 14:
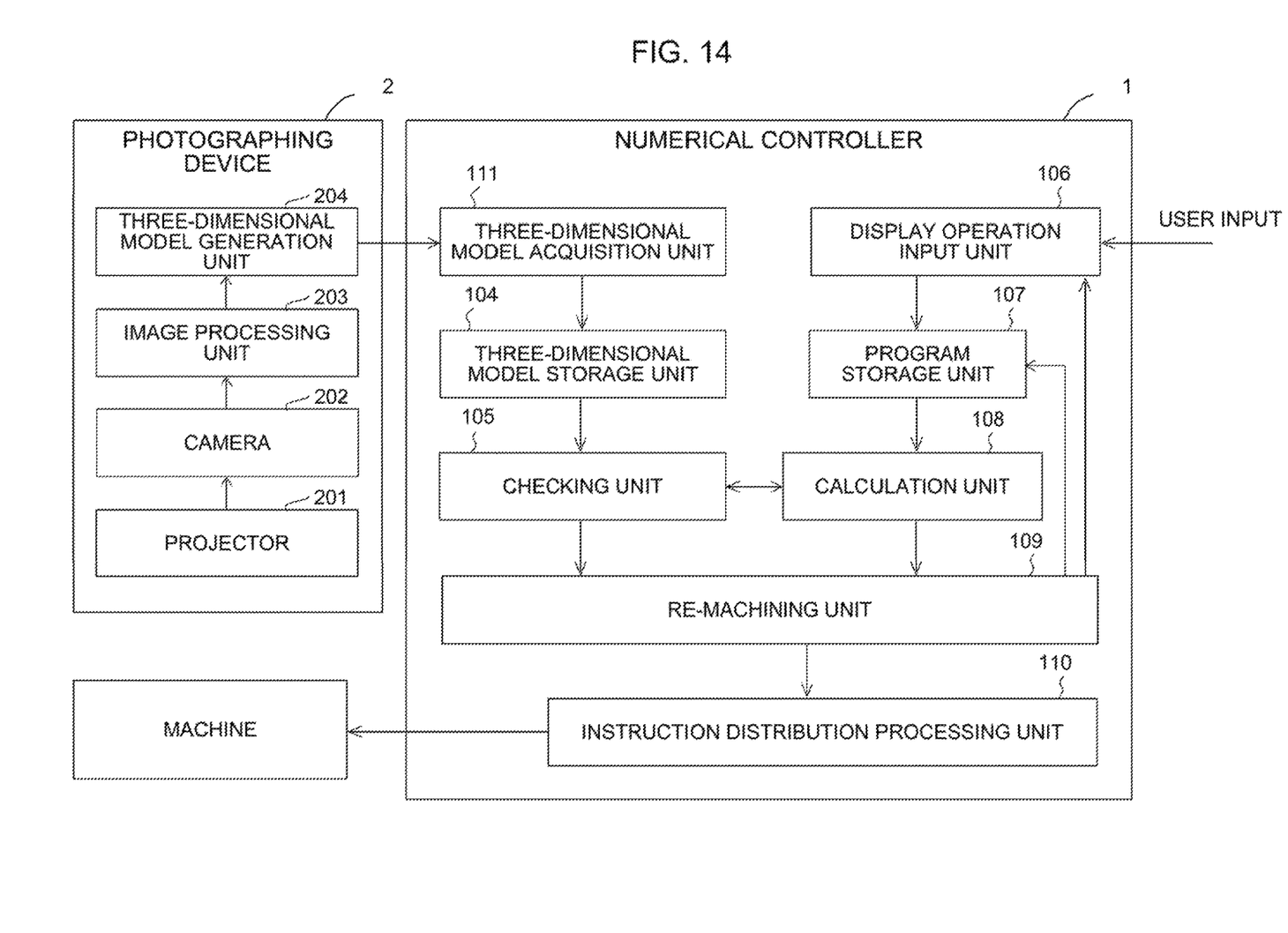
FIG. 14 is a schematic functional block diagram of a control system according to a second embodiment.

FIG. 14 is a schematic functional block diagram of a control system 200 including a controller 1 and a photographing device 2 according to a second embodiment of the present invention.

Compared to the first embodiment described above, the photographing device 2 further includes an image processing unit 203 and a three-dimensional model generation unit 204. The controller 1 includes a three-dimensional model acquisition unit 111, instead of the image acquisition unit 101, the image processing unit 102, and the three-dimensional model generation unit 103. Components other than those described above are the same as those of the first embodiment. Hereinafter, unique processings of the second embodiment will be described.

According to the second embodiment, a camera 202 outputs generated image data to the image processing unit 203. The image processing unit 203 extracts feature points from one or more image data generated by the camera 202 and outputs the feature points to the three-dimensional model generation unit 204. The three-dimensional model generation unit 204 generates a three-dimensional model based on the feature points extracted by the image processing unit 203 from one or more image data, and outputs the three-dimensional model to the three-dimensional model acquisition unit 111. The three-dimensional model acquired by the three-dimensional model acquisition unit 111 is stored in a three-dimensional model storage unit 104.

According to the present embodiment, for example, as the photographing device 2 having a function of outputting a three-dimensional model is used, it is possible to implement the controller 1 with a simpler configuration.

Hereinabove, although the embodiments of the present invention have been described, the present invention is not limited to the embodiments described above and it is possible to implement the present invention in various aspects with appropriate modification.

The invention claimed is:

1. A control system, comprising:
a controller that controls machining of a workpiece; and
a photographing device that photographs an image of the workpiece under machining operation, wherein
the controller includes a processor configured to:
  acquire the image,
  generate a three-dimensional model of the workpiece under machining operation based on the image,
  compare the three-dimensional model of the workpiece under machining operation and a three-dimensional model generated by a machining simulation with each other,
  determine a presence of a machining defect in the workpiece based on a result of the comparison,
  determine a cause of the machining defect as being:
    a workpiece cause due to a physical difference in set workpiece physical parameters in a machining program controlling the machining operation and actual workpiece physical parameters, or
    a tool cause due to a physical difference in set tool physical parameters in the machining program controlling the machining operation and actual tool physical parameters,
  determine whether re-machining of the workpiece is possible to correct the machining defect,
  when the machining defect is determined to be due to insufficient cutting of the workpiece, automatically:
    determine that re-machining is possible,
    modify a machining setting to adjust for the physical difference of the cause of the machining defect, and
    execute additional machining on the workpiece based on the modified machining setting, and
  when the machining defect is determined to be due to excessive cutting of the workpiece, automatically:
    determine that re-machining is not possible, and
    output the cause of the machining defect to an operator of the machine.

2. The control system according to claim 1, wherein when it is determined that the machining defect is present and the re-machining is not possible, the processor is further configured to present the cause of the machining defect or a countermeasure for the machining defect.

3. A control system, comprising:
a controller that controls machining of a workpiece; and
a photographing device that photographs the workpiece under machining operation and outputs a three-dimensional model of the workpiece under machining operation, wherein the controller includes a processor configured to:
  acquire the three-dimensional model of the workpiece under machining operation,
  compare the three-dimensional model of the workpiece under machining operation and a three-dimensional model generated by a machining simulation with each other,
  determine a presence of a machining defect in the workpiece based on a result of the comparison,
  determine a cause of the machining defect as being:
    a workpiece cause due to a physical difference in set workpiece physical parameters in a machining program controlling the machining operation and actual workpiece physical parameters, or
    a tool cause due to a physical difference in set tool physical parameters in the machining program controlling the machining operation and actual tool physical parameters,
determine whether re-machining of the workpiece is possible to correct the machining defect,
when the machining defect is determined to be due to insufficient cutting of the workpiece, automatically:
  determine that re-machining is possible,
  modify a machining setting to adjust for the physical difference of the cause of the machining defect, and
  execute additional machining based on the modified machining setting, and
when the machining defect is determined to be due to excessive cutting of the workpiece, automatically:
  determine that re-machining is not possible, and
  output the cause of the machining defect to an operator of the machine.

4. A controller, comprising:
a processor configured to:
  acquire a three-dimensional model of a workpiece under machining operation and compares the three-dimensional model of the workpiece under machining operation and a three-dimensional model generated by a machining simulation with each other;
  determine a presence of a machining defect in the workpiece based on a result of the comparison, and
  determine a cause of the machining defect as being:
    a workpiece cause due to a physical difference in set workpiece physical parameters in a machining program controlling the machining operation and actual workpiece physical parameters, or
    a tool cause due to a physical difference in set tool physical parameters in the machining program controlling the machining operation and actual tool physical parameters,
  determine whether re-machining of the workpiece is possible to correct the machining defect,
  when the machining defect is determined to be due to insufficient cutting of the workpiece, automatically:
    determine that re-machining is possible,
    modify a machining setting to adjust for the physical difference of the cause of the machining defect, and
    execute additional machining on the workpiece based on the modified machining setting, and
  when the machining defect is determined to be due to excessive cutting of the workpiece, automatically:
    determine that re-machining is not possible, and
    output the cause of the machining defect to an operator of the machine.

\* \* \* \* \*